United States Patent [19]

Sueda et al.

[11] Patent Number: 5,197,115
[45] Date of Patent: Mar. 23, 1993

[54] INFERENTIAL SYSTEM AND INFERENTIAL METHOD

[75] Inventors: Naomichi Sueda, Isehara; Junzo Suzuki, Yamato, both of Japan

[73] Assignee: Kabushiki Kaisha Toshiba, Kawasaki, Japan

[21] Appl. No.: 514,267

[22] Filed: Apr. 25, 1990

[30] Foreign Application Priority Data

Apr. 25, 1989 [JP] Japan .................................. 1-105529

[51] Int. Cl.[5] ............................................ G06F 15/18
[52] U.S. Cl. ....................................... 395/50; 395/51; 395/64
[58] Field of Search ...................... 364/513; 395/51, 50

[56] References Cited

U.S. PATENT DOCUMENTS 4,761,746  8/1988  Tano et al. ............................ 364/513
4,837,735  6/1989  Allen, Jr. et al. .................... 364/513
4,882,691 11/1989  Schor ................................... 364/513

OTHER PUBLICATIONS

Broanston et al., Programming Expert Systems in OPS5, Addison-Wesley Pub. Co., 1985, 62-71.
Charniak et al., Artificial Intelligence Programming 2nd ed., Lawrence Erlbaum Assoc., 1987, 248-275.
Parson et al., "Constant-Time Pattern Matching for Real-Time Production Systems", *SPIE vol.* 1095 *Applications of Artificial Intelligence*, pp. 971-982.
Winston, *Artificial Intelligence*, Addison-Wesley 1984, pp. 170-171.
Duncan, "Evaluating Advanced Architectures for AI Production Systems", *Proc. IEEE* 1989 *Aerospace & Electronics Conf.*, pp. 69-76.
Handleman et al., "An Architecture for Rear-Time Rule-Based Control", Proc. 1987 American Control Conference, pp. 1638-1642.

*Primary Examiner*—Michael R. Fleming
*Assistant Examiner*—Robert W. Downs
*Attorney, Agent, or Firm*—Banner, Birch, McKie & Beckett

[57] ABSTRACT

An inferential method is disclosed, where fact information and a time tag assigned thereto are matched and stored. A rule group is stored. A pattern match of the fact information and the rule group is executed. A combination of the fact information and the rule group is selected. When a plurality of combinations have been selected, one of them is further selected. The selected rule is executed and new fact information in the working memory is created. When new fact information is created to the working memory by executing the rule, if the time tag assigned to the fact information exceeds the given value, the time tag which has been assigned to the fact information in the working memory is reassigned.

4 Claims, 3 Drawing Sheets

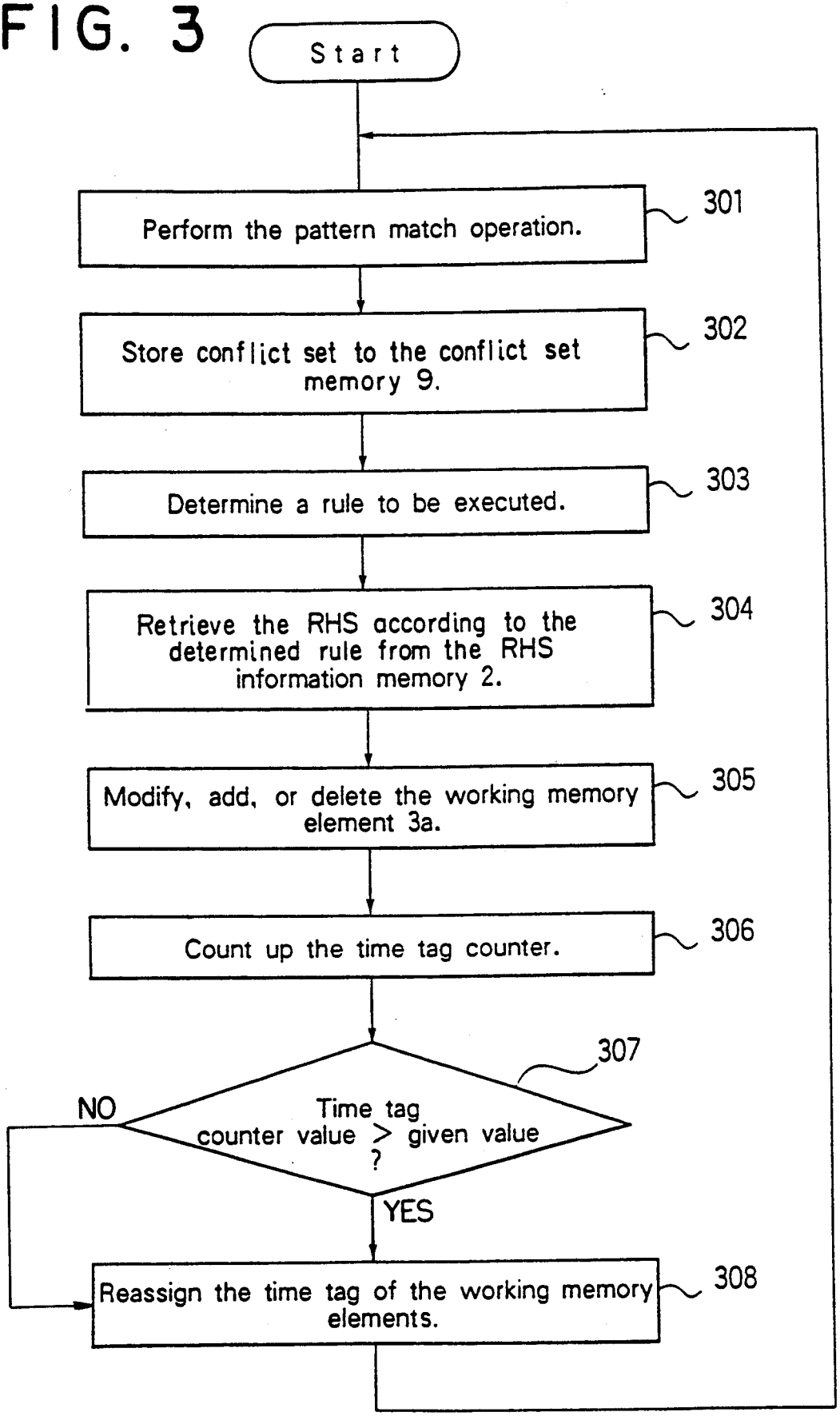

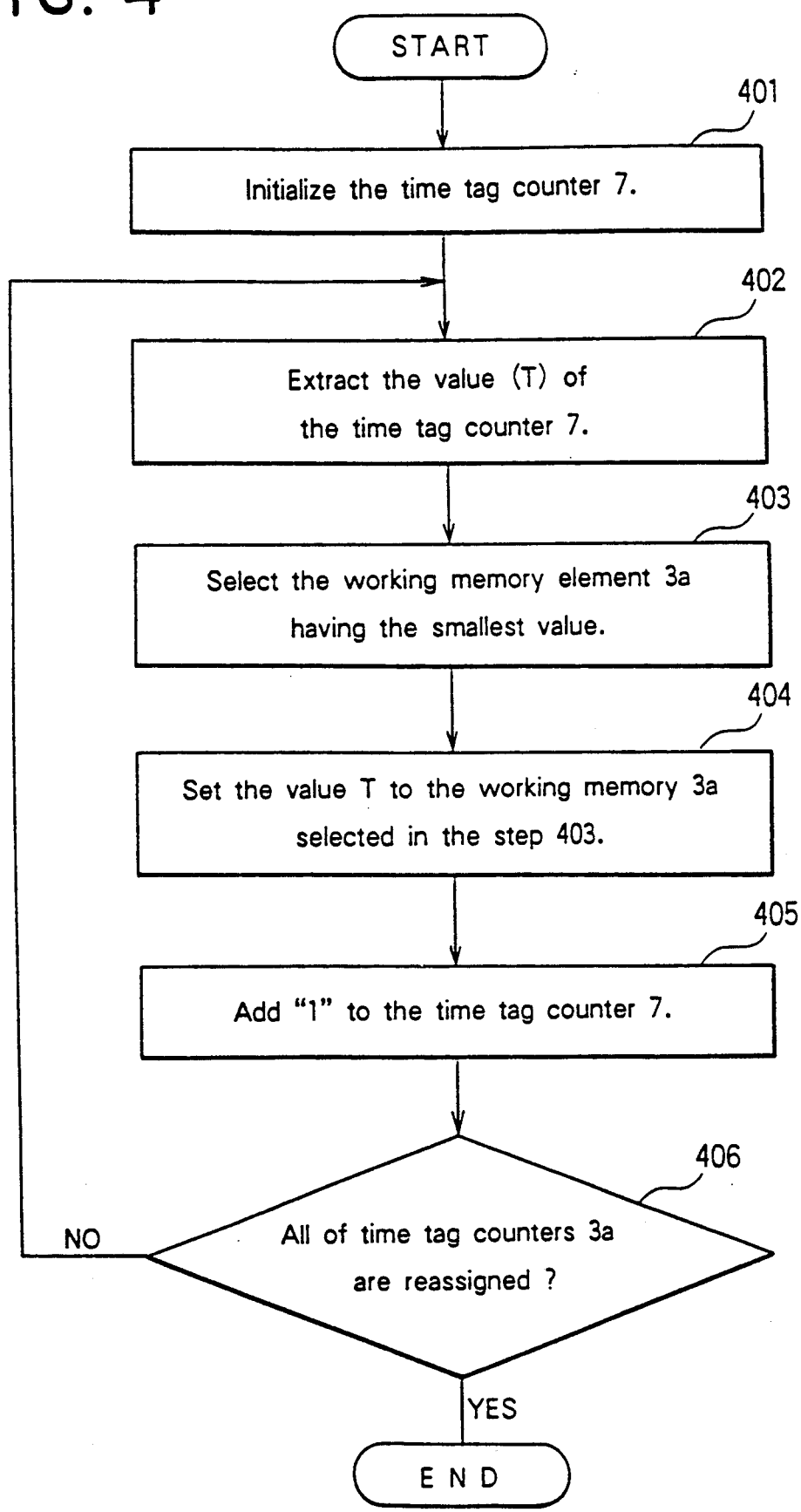

INFERENTIAL SYSTEM AND INFERENTIAL METHOD

BACKGROUND OF THE INVENTION

1. Field of the Invention

The present invention relates to an inferential system and inferential method which is used in an expert system and so forth.

2. Description of the Related Art

Recently, a computerized expert system which provides an intellectual function of human beings has been widely developed.

As an inferential method using such an expert system, a method named "Rete algorithm" is known.

This method uses a rule group comprising "if ... then ..." condition elements and execution elements, where a cycle of a pattern match, conflict resolution, and action (recognize-act cycle) is repeated and when there is no rule to pattern match, the inferential operation is completed.

In this method, current fact information is stored in a working memory. The pattern match operation is executed by comparing working memory elements stored in the working memory with LHS of rules.

The "if part" (condition elements) is called LHS (Left Hand Side) and the "then part" (execution elements) is called RHS (Right Hand Side).

However, there may be two or more combinations of the working memory elements and the rules which are matched. It is named a conflict set.

This conflict can be solved using conflict resolution strategies.

One of them uses time tags.

The time tags are numbers assigned to working memory elements. Each time tag represents the order of each working memory element created in the working memory.

For example with this method, it is possible to resolve the conflict in the strategy that "any rule which matches the most recent working memory element is executed with the highest priority".

The RHS of the rule which is selected by resolution the conflict is actually executed. Thus, the working memory elements in the working memory are modified, added, or deleted.

In addition, a time tag which represents the order of the creation is added to a working memory element which is newly created in the working memory.

In other words, the larger the value of the time tag, the more newly the working memory element has been created.

However, in the expert systems which have been implemented, when an inferential operation is continuously executed in real time, the values of the time tags increase until the last inferential result is obtained. Consequently, an overflow often occurs in the time tags.

SUMMARY OF THE INVENTION

An object of the present invention is to solve such a problem and to provide an inferential method wherein an overflow of numbers assigned to the working memory element is prevented and thereby an inferential operation can be continuously and stably executed.

To accomplish the above object, the present invention comprises the steps of storing a rule group and fact information; matching fact information with a time tag assigned thereto and storing them into a working memory; executing a pattern match of said fact information and said rule group, to select combinations of said fact information and said rule group; selecting one combination when a plurality of combinations are selected in said pattern match; executing said rule being selected and creating new fact information in said working memory; and changing said time tag assigned to said fact information in said working memory when creating new fact information in said working memory by executing said rule if said time tag assigned to said fact information exceeds a given value.

In the present invention, when creating new fact information in the working memory by executing a rule if the time tag assigned to the fact information exceeds the given value, the time tags which were assigned to the fact information in the working memory are changed. Thus, when executing an inferential operation is continuously executed, it is possible to prevent tag numbers assigned to fact information from being overflowed. Consequently, the inferential operation can be continuously and stably executed.

BRIEF DESCRIPTION OF DRAWINGS

FIG. 3 is a flow chart showing an operation of the embodiment.

FIG. 4 is a flow chart explaining step 308 in more detail.

DESCRIPTION OF PREFERRED EMBODIMENT

By referring to the attached drawings, an embodiment of the present invention will be described in the following.

Figure 1:
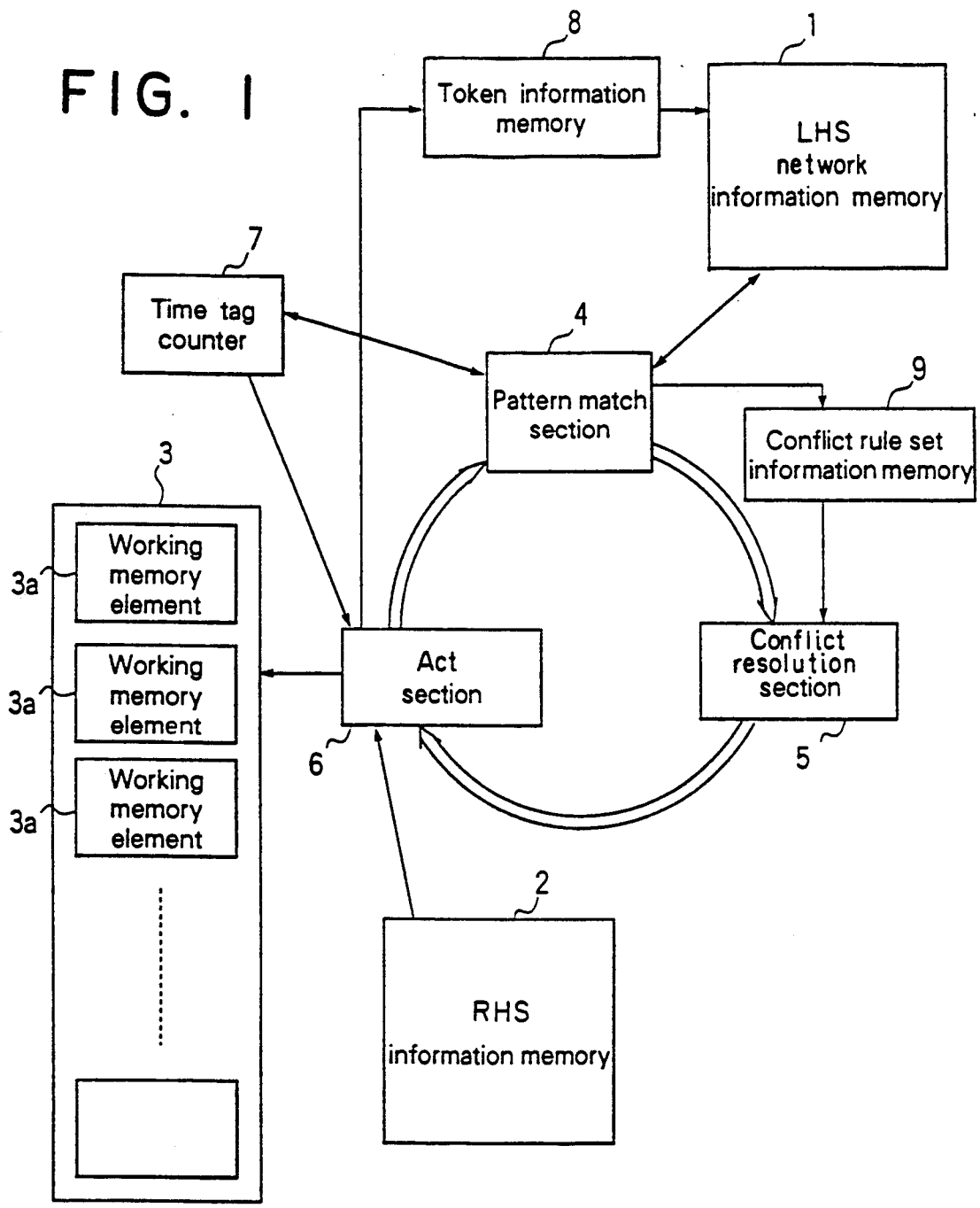
FIG. 1 is a block diagram describing the structure of an inferential method embodying the present invention.

FIG. 1 is a block diagram showing the structure of an inferential apparatus necessary for executing the inferential method embodying the present invention.

As shown in FIG. 1, the inferential apparatus comprises LHS network information memory 1 for storing LHS of a rule (necessary for executing an inference as network information), RHS information memory 2 for storing RHS of the rule, a working memory 3 for storing a plurality of working memory element $3a$, and so forth each of which is assigned a time tag representing the order of creation, a pattern match section 4 for matching the LHS of a rule in the LHS network information memory 1 with the working memory element $3a$ in the working memory 3, a conflict resolution section 5 for comparing each time tag added to each working memory element $3a$ and for selecting a higher priority rule to be executed if conflict sets are selected by the pattern match section 4, an act section 6 for retrieving the RHS of the rule selected by the conflict resolution section 5 and for executing it, a time tag counter 7 for holding a current time tag number assigned to the working memory element $3a$ when the execution of the RHS of the rule causes the working memory 3 to be changed and thereby a new working memory element $3a$ is created, a token information memory 8 for storing token information which is sent to the LHS network information memory 1 when the content of the working memory 3 is changed and the changed information is matched, and a conflict set memory 9 for storing the rule set selected by the pattern match section 4.

Figure 2:
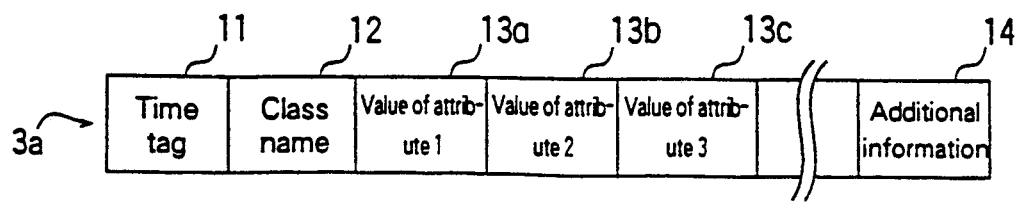
FIG. 2 is a diagram showing a working memory element in a working memory of FIG. 1.

FIG. 2 is a diagram showing the structure of the working memory element 3a in the working memory 3 of FIG. 1.

As shown in the figure, the working memory element 3a comprises a time tag 11, a class name 12, attribute values 13a, 13b, 13c, and so forth, and additional information 14.

For example, the class name is the name of a person. The attribute 1 represents that the sex of the person is male. The attribute 2 represents that the age of the person is 40.

Then, by referring to a flow chart of FIG. 3 and FIG. 4, the operation of the inferential method will be described in the following.

Assume that the working memory element 3a is added to the working memory 3 with any operation.

Thus, the working memory element 3a is set to the token information memory 8 as token.

On the other hand, at the node of each network in the LHS network information memory 1, an intermediate pattern match state of each working memory element 3a in the working memory 3 is stacked.

Thus, in the pattern match section 4, by sending the token information which is set in the token information memory 8 to the LHS network information memory 1, a rule which completely matches the intermediate pattern match state and token information stacked at the node of each network and passes the network becomes the rule which succeeds in the pattern match (step 301).

After that, the rule set consisting of the working memory element 3a and the rule which succeeds in the pattern match is set in the conflict set memory 9 (step 302).

The conflict resolution section 5 references the conflict set memory 9, compares the time tags assigned to the working memory elements 3a of each rule set, determines which working memory element 3a was created last, and determines the rule to be executed (step 303).

After that, the act section 6 obtains the RHS according to the determined rule from the rule RHS information memory 2, and executes the RHS (step 304). Then, the act section 6 performs the process such as modification, addition, and deletion of the working memory element 3a (step 305).

When a new working memory element 3a is added to the working memory 3, the time tag counter 7 is counted up by "1" (step 306). The resultant value is the value of the time tag of the working memory element 3a to be added.

When one recognize-act cycle is completed, it is determined whether or not the value of the time tag counter 7 exceeds the given value (step 307).

This given value is set to prevent the time tag from being overflowed.

When the check result is less than the given value of the time tag counter 7, the next recognize-act cycle is executed.

When the value of the time tag counter 7 exceeds the given value, the time tag of each working memory element 3a in the working memory 3 is reassigned (step 308).

The time tag is reassigned from the initial number "1" in synchronization with the time tag counter 7 in ascending order from the lowest time tag of the working memory element 3a.

In more detail, the reassigning of the time tag (step 308) is the following.

FIG. 4 is a flow chart explaining step 308 in more detail.

The time tag counter 7 is initialized (step 401). Namely "1" is set in the time tag counter 7.

The value (T) of the time tag counter 7 is extracted (step 402).

The working memory element 3a having the smallest value in the working memory 3 is selected (step 403).

The value (T) of the time tag counter 7 is set to the working memory element 3a selected in the step 403 (step 404).

"1" is added to the value (T) of the time tag counter 7 (step 405).

All of the time tag counter 3a are reassigned by repeating step 402 to 405 (step 406).

Thus, according to the inferential method of the embodiment, when the probability that the time tag assigned to the working memory element 3a is overflowed becomes high, the time tag of the working memory element 3a stored in the working memory 3 can be reassigned from the initial value and thereby the inference of continuous equations can be correctly and precisely executed.

In other words, in the inferential method according to the present invention, when creating new fact information by executing a rule, the probability that the time tag assigned to the fact information is overflowed is checked according to the number of execution times of the rule. When the number of times exceeds a given value, the time tags assigned to fact information are reassigned. Thus, the overflow of the time tags assigned to the fact information can be prevented and thereby the inference can be stably executed.

What is claimed is:

1. An inferential method comprising the steps of:
    storing rules in a production memory, each of the rules having a condition part and an action part;
    storing working memory elements in a working memory, each working memory element including fact information and a time tag which has a value indicating a creation order of the working memory element;
    executing a pattern match of the working emory elements in the working memory and the condition parts of the rules to generate a conflict set constituted by matched rules;
    selecting one matched rule out of the conflict set by a conflict resolution strategy, wherein the conflict strategy prioritized the matched rules according to the time tag values of the working memory elements when the conflict set includes a plurality of matched rules;
    executing the action part of the selected rule, the action part executing step resulting in the deletion of a working memory element or creation of a new working memory element, the time tag of the working memory element being deleted when the working memory element is deleted and a new time tag being generated when the new working memory element is created; and
    changing the time tags values of the working memory elements when the value of the generated time tag exceeds a given value thereby avoiding an overflow of time tags, the changed time tag values remaining in a relationship reflecting the creation order of the working memory elements.

2. The inferential method according to claim 1, wherein said changing step comprises:

(a). initializing a value in a time tag counter;
(b). selecting the working memory element with the smallest time tag value;
(c). replacing a value of the time tag of the working memory element selected in step (b) with the value in said time tag counter;
(d). incrementing the time tag counter;
(e). repeating steps (b) through (d) until all of the working memory elements have a newly set time tag.

3. An inferential system comprising:
a production memory;
means for storing rules in said production memory, each of the rules having a condition part and an action part;
a working memory;
means for storing working memory elements in said working memory, each working memory element including fact information and a time tag having a number indicating a creation order of the working memory element;
means for executing a pattern match of the working memory elements and the condition parts to generate a conflict set constituted by matched rules;
means for selecting one rule out of the conflict set by a conflict resolution strategy which prioritizes the matched rules in the conflict set according to the numbers of the time tags of the working memory elements when the conflict set includes a plurality of matched rules;
means for executing the action part of the selected rule, said means for executing the action part of the selected rule comprising means for deleting a working memory element including its time tag or creating a new working memory element including a new time tag; and
means for changing the numbers of the time tags of the working memory elements when the number of the new time tag exceeds a given number so as to avoid an overflow of the time tags, the changed numbers remaining in a relationship reflecting the creation order of the working memory elements.

4. An inferential method comprising the steps of:
storing rules having a condition part and an action part in a production memory;
storing working memory elements in a working memory, each working memory element comprising fact information and a time tag indicating the relative order in which the working memory element was created;
executing a pattern match of the working memory elements and the condition parts to generate a conflict set constituted by matched rules;
selecting one rule according to a conflict resolution strategy which prioritizes the matched rules based on the time tags of the working memory elements when said conflict set contains a plurality of matched rules;
executing the action part of the selected rule, the executing step resulting in the deletion of a working memory element or the creation of a new working memory element, wherein when said executing step results in the creation of a new working memory element, the executing step comprises generating a new time tag for the new working memory element; and
renumbering the time tags of the working memory elements if a value of the new time tag exceeds a given value, wherein said step of renumbering includes preserving the relative order of creation of the working memory elements.

* * * * *